Aug. 7, 1928.
L. E. TOPHAM
LAST MEASURING STICK
Filed Nov. 28, 1922
1,679,387
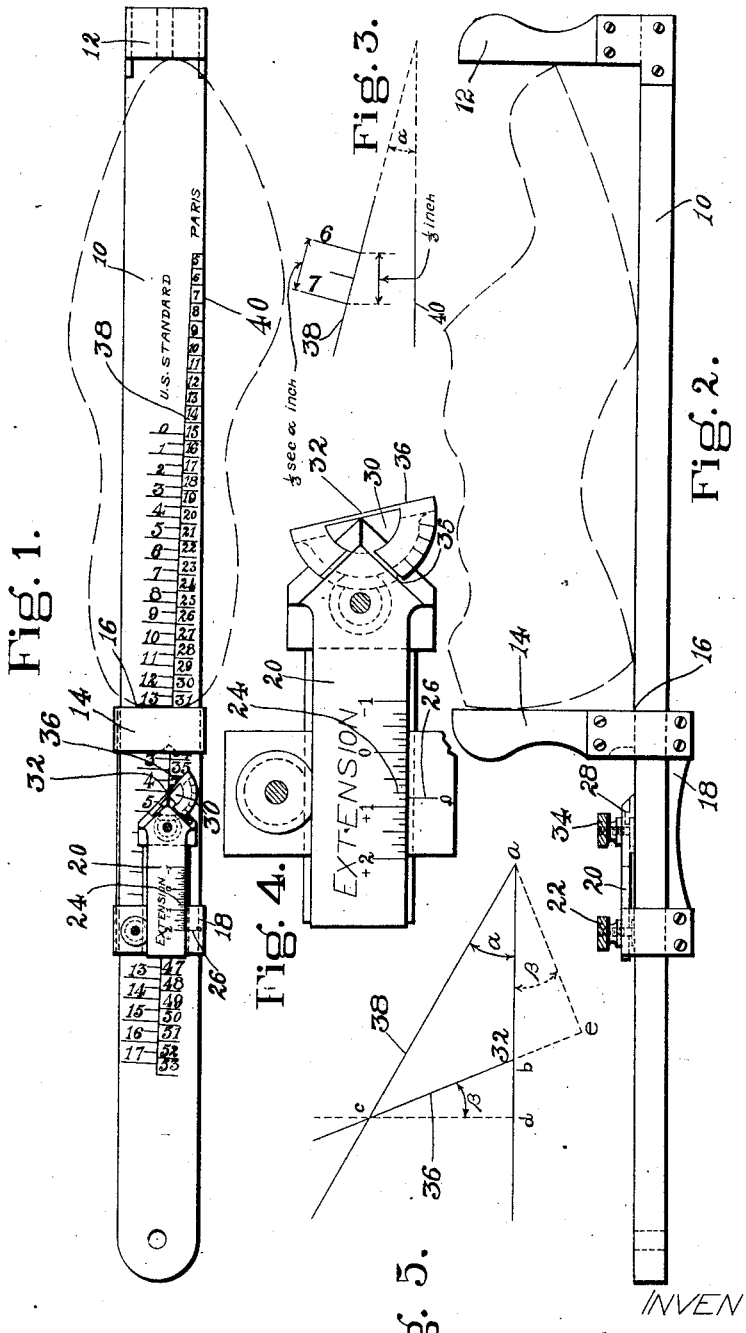
INVENTOR-
Lawrence E Topham
By his Attorney,
Nelson W. Howard Patented Aug. 7, 1928.

1,679,387

UNITED STATES PATENT OFFICE.

LAURENCE E. TOPHAM, OF LYNN, MASSACHUSETTS, ASSIGNOR TO UNITED SHOE MACHINERY CORPORATION, OF PATERSON, NEW JERSEY, A CORPORATION OF NEW JERSEY.

LAST-MEASURING STICK.

Application filed November 28, 1922. Serial No. 603,831.

This invention relates to so-called measuring sticks such as are used, for example, in measuring the lengths of lasts.

Such a stick consists generally of a rod having on it two abutments, one of which, at least, is movable. The rod is graduated in units ⅓ inch in length (American system), and the length of an object held between the abutments can be read off. The instrument is a sort of caliper.

Such an instrument can be and is also used to measure the lengths of "insole patterns," which are flexible patterns which will just fit over the bottoms of the lasts. A difficulty arises here in that the patterns and lasts, as measured, are frequently of different lengths, owing to the following reason. The pattern is measured in extended form and is laid flat on the stick for measurement, as indicated in dotted lines in Fig. 1. The last is laid on the stick as indicated in dotted lines in Fig. 2, with the heel corner and the ball point lying on the stick. Thus the length of the pattern, as measured, has no definite relation to that of the last when measured on the stick, and it is desirable for manufacturing convenience that the last measurement should be expressed in the same terms as the measurement of the (flattened) pattern that fits it. On a high heeled size 4 last, the pattern may be ½ inch longer than the last: on a low heeled size 4 the pattern may be ¼ inch shorter than the last. On a medium heeled last, they may be the same. This difficulty becomes more complicated when the lasts and patterns are graded. The patterns vary in length by ⅓ inch per size, but a last which is shorter than its pattern must be graded more slowly than that i. e., at the rate of less than ⅓ inch per size, for example if they are to correspond; as the changes must be the same percentage of both. For example, a certain high heeled size 4 last measured 9.75 inches and its pattern 10.15 inches. The size 1$^s$ graded from these measured 8.79 inches and 9.15 inches respectively. The size 7$^s$ graded from them were 10.71 inches and 11.15 inches respectively. Thus the last must stretch 1.92 inches while the pattern stretches 2 inches, and the last must therefore be graded with the smaller magnification factor. It is a principal object of the present invention to provide a last measuring stick in which the factor of proportionality between an increase in the scale reading or last measurement and the actual change in caliper opening necessary to produce it, is other than unity; and indeed, so that this factor may be adjusted at will.

Accordingly an important feature of the invention consists in a relative angular adjustment between the graduated scale and the index of a size stick. This permits a lack of equivalence between the reading of the index on the scale and the actual movement of the member which carries it.

Another important feature consists in placing the scale at an acute angle with the direction of movement of the member carrying the index. When the index is set out of the perpendicular to the direction of its movement along the scale, its actual movement relatively to the scale-carrying member will be at a different rate from that of its intersection with the scale.

Another feature is comprised in a novel caliper arm in adjustable relation to an index which reads on a scale relatively to which the arm and index are movable.

These and other features of the invention including certain details of construction and combinations and arrangements of parts will be understood from the following description of a preferred embodiment thereof selected for purposes of illustration and shown in the accompanying drawings in which, Fig. 1 is a plan view of the stick.

Fig. 2 is an elevation.

Fig. 3 is a diagram illustrating the graduation.

Fig. 4 is an enlarged view of the sliding member.

Fig. 5 is a diagram illustrating the computation of the constants of the stick.

The instrument illustrated comprises the ordinary stick or base 10 and end abutment 12. The rear abutment 14 slides on the stick as usual, but the scale reading is not taken at the edge 16. The abutment 14 has a backwardly projecting arm 18 in the upper side of which there is a slide 20, adjustable lengthwise of the stick and held by a set screw or clamp 22. This slide has a little scale 24, reading against an index 26. The front end of this slide is undercut in a circular channel 28 in which is adjustable a circular segment 30 about its center 32. A clamp 34 holds the segment 30 in any position of adjustment. The circular edge of the segment is graduated and its adjusted position can be read off against the edge 35 of the slide 20. The edge 36 of the segment is a diameter thereof and is the main index of the instrument.

A line 38 extends along the stick at an angle $\alpha$ with its edge 40 (or with its length, see Fig. 3), and the graduation marks of the stick are distributed along this line as shown in Figs. 1 and 3. The graduations of the scales 38 and 24 are in "shoe size units", by which is meant that the successive marks correspond to successive aliquot parts of a shoe size. The scale 38 is shown as graduated in ½ American sizes (⅙ inch) and in French "points" (⅔ cm); and the scale 24 is shown as graduated in ⅛ American sizes (1/24 inch). Preferably, for women's work, the line 38 is, as a whole, at such a distance from the edge 40 that the center 32 will just ride through the intersection of the #4 graduation mark with the line 38. The reason for this is that the model women's size is #4, and the other sizes are graded from the #4, and consequently at the #4 mark the two systems of measurements on the stick should coincide. The men's model size is #7, and a stick, if desired for men's work, would be constructed accordingly, as will appear below. The ⅓-inch spacing of these graduation marks is measured parallel to the length of the stick and not parallel to the line 38, as shown in Fig. 3. The intersections of the 6 and 7 marks with the line 38 are ⅓-inch apart measured parallel to the line 40 and are ⅓ sec $\alpha$ inch apart along the line 38. The whole system of graduation marks is so placed with relation to the abutment 12 that when the slide 20 is set with the zero mark of its scale coinciding with the index 26, and the edge 36 set perpendicular to the line 40, the intersection of the edge 36 with the line 38 will read the length of an object just included between the abutments, and this reading will vary at the same rate as does the length of the object. If the segment (and line 36) are adjusted as shown in Fig. 4, the intersection of the lines 36 and 38 will move to the left more rapidly than the abutment 16, as the abutments are separated, so that the scale reading increased more rapidly than the changing distance between the abutments. If the segment 30 is turned in the opposite direction, so that the edge 36 slopes upward to the right in Fig. 1, the scale reading will increase more slowly than the length of the object.

Suppose that we have a size 4 model which has a standard toe and therefore measures 4 on the standard stick, and suppose that the insole pattern is longer than the last. We set the segment 30 with the line 36 extending upwardly to the left at a certain position, as shown in Figs. 1 and 4, and set the slide 20 so that the line 36 reads against the 4 division on the line 38 when the abutments 12 and 16 just take the last between them, and as the arm 18 and abutment 14 are moved to the left in Fig. 1, the 5 mark will be reached by the line 36 before the abutment has moved ⅓ inch, so that the stick actually measures a grade of less than the standard ⅓ inch per size when its index registers a movement of ⅓ inch per size and can thus be used to grade lasts to fit the insoles graded ⅓ inch per size, which is the object sought in this particular problem. The application of the instrument to other problems will be obvious.

The determination of the constants of the stick may be made as follows:—See Fig. 5. Let the line $abd$ be parallel to the line 40, and let $b$ be the center 32 on the slide 18. Let $cb$ be the line 36, and $ca$ be the line 38, the point $a$ being at the #4 mark in the arrangement being described. Let $\alpha$ be the angle between the lines 38 and 40 and let $\beta$, measured positive counter clockwise and negative clockwise, denote the setting of the segment (and of the line 36). Let the abutment 16 move to the left so that the point 32 moves from $a$ to $b$. Then the actual abutment movement or change in last length is $ab$ measured in ⅓ inch units and the change in the scale reading measured in the same units is $ad$.

$$ad = ac \cos \alpha = \frac{ae}{\cos(\alpha+\beta)} \cos \alpha = \frac{ab \cos \beta}{\cos(\alpha+\beta)} \cos \alpha$$
$$= ab \frac{\cos \alpha \cos \beta}{\cos \alpha \cos \beta - \sin \alpha \sin \beta} = \frac{ab}{1 - \tan \alpha \tan \beta}$$

We can therefore regard $ab$ as a last grade (or change in length due to a grading operation) and $ad$ as the corresponding insole grade, so that the ratio of the last grade to the insole grade is $$\frac{ab}{ad} = 1 - \tan \alpha \tan \beta \quad (A)$$

In other words, the instrument being properly constructed, (as shown below), if $ab$ is one inch = (3 thirds of one inch), $ad$ will be $$\frac{3}{1 - \tan \alpha \tan \beta} \text{ thirds}$$

of an inch long, but the point $c$, where the reading is taken, will be three scale divisions from $a$, along the line $ac$, the line $ac$ being three scale divisions long, each division along the line being $$\frac{1}{3 \cos \alpha}$$

inches long measured in true length units along the line $ac$.

With the construction shown, $\beta$ may conveniently vary from $+45°$ to $-45°$. To construct the stick, suppose we assume that we are to deal with a maximum of $\frac{1}{2}$ inch variation in length between last and insole at the model (4) size. The standard size 4 last is about $9\frac{1}{2}$ inches long. Suppose that the insole pattern for the size 4 is 10 inches long. Then if the insole stretches $\frac{1}{3}$ inch, the last must stretch $$\frac{9\frac{1}{2}}{10}$$

times as much and so the grading ratio between the last and insole is $$\frac{9\frac{1}{2}}{10} = \frac{10-\frac{1}{2}}{10} = 1 - \tan\alpha \tan\beta$$

and since this is the extreme case, $\beta$ will be here conveniently chosen at its extreme limit of $45°$ (for the design shown) and consequently $\tan\beta=1$. Therefore $$\tan\alpha = \frac{\frac{1}{2}}{10} = .05$$

and $$\alpha = 2°53'.$$

The value of the $\beta$ setting for any other case (for the same design of stick) such as a deficiency of $\frac{1}{8}$ inch between the insole and the size 4 model is obtained from $$\frac{10-\frac{1}{8}}{10} = 1 - .05 \tan\beta$$

whence $$\tan\beta = \frac{1}{4}$$

$$\beta = 14°.$$

For a given value of $\alpha$, $\tan\beta$ is always proportional to the given discrepancy between the last and insole.

In case the instrument is to be used on men's work, where the model size is 7, the stick will be arranged so that the center 32 will pass through the 7 mark on the line 38. The theory will be otherwise similar to that developed above. The standard length of the size 7 is about $10\frac{1}{2}$ inches.

Many lasts are not of standard length for their size. For example, a size 4 may run from $9\frac{1}{4}$ to 10 inches in actual stick length depending on the style of the toe, though there will be the same foot room in it. In theory the actual stick length of the model should be used in developing the constants of the stick but a close approximation may be secured by using a stick made for another reasonably approximating length. Whether or not the error is tolerable is easily ascertained. In any case, it is only necessary to alter the angle $\alpha$ on the stick 10. The abutment 14 and its associated parts will work just the same in connection with any angle $\alpha$.

In the claims, the expressions "at an angle" referring to the situation of the line 38, and "an oblique angle" referring to the situation of the index line 36, are intended to exclude parallelism with the line 40 on the one hand and perpendicularity to it on the other.

The slide 20 has still further capabilities for usefulness in connection with the manufacture of lasts. As already stated, lasts of the same size vary in actual stick length. The last turner may be told to produce a last which is a "7 with $1\frac{1}{2}$ sizes extension". This means that the last must stick $\frac{1}{2}$ inch more than the standard 7 length, and in testing his product he makes this correction to the standard length mentally. It is the same for all the lasts of that style irrespective of length and width (ignoring certain refinements not universally met with), and the adjustment of the slide 20, in the stick of the present invention, supplies a means of setting it up on the stick once for all. In short, if the lasts are to be $\frac{7}{8}$ size over the standard lengths, the slide 20 will be set to read this amount against the index 26, as shown in Fig. 4, when the last maker will have only to make his product measure its marked or size length.

Broadly, a last stick for accomplishing this result is the prior invention of George G. Schelter, and will be found described and claimed in United States Letters Patent No. 1,497,739, issued June 17, 1924, on his application.

Having thus described my invention, what I claim as new and desire to secure by Letters Patent of the United States is:—

1. A last measuring stick comprising a body graduated in shoe size units, an abutment attached to said body, a second abutment sliding on said body, said abutments being arranged to caliper a last placed between them, and an index reading on the graduated body adjustably connected to said second abutment, said adjustable connection comprising a short scale graduated positively and negatively in shoe size units but only several sizes long, and an index mark for the short scale, whereby the second-named abutment may be adjusted relatively to the first-named index by the amount of the extension of the last being measured.

2. A measuring instrument comprising a body and a caliper arm sliding along said body, one of the said elements carrying a graduated scale which is at an acute angle to the direction of sliding and the other carrying an index line reading on said scale, said scale and index line being relatively angularly adjustable in a plane containing the axis of the scale and the direction of sliding so that the index line may read on different points of the scale in the same adjustment of the caliper arm.

3. A measuring instrument comprising a body and a caliper arm slidable along said body, said body having a uniformly graduated scale along its length but at an angle thereto, and the caliper arm having an index mark arranged at an oblique angle with the length of the body and reading on the scale, whereby the movement of the caliper as indicated on the scale is unequal to its movement as measured on the body.

4. A measuring instrument comprising a body and a caliper arm slidable along said body, said body having a graduated scale along its length but at an agle thereto, and the caliper arm having an index mark arranged at an oblique angle with the length of the body and reading on the scale, whereby the movement of the caliper as indicated on the scale is unequal to its movement as measured on the body, said index mark and scale being relatively rotatable to vary the ratio of the movements.

5. A measuring instrument comprising a body and a caliper arm slidable along said body, said body having a graduated scale along its length but at an angle thereto, and the caliper arm having an index mark arranged at an oblique angle with the length of the body and reading on the scale, the orientation of the graduated scale on the body being determined by formula (A) of the annexed specification.

In testimony whereof I have signed my name to this specification.

LAURENCE E. TOPHAM